UNITED STATES PATENT OFFICE 2,321,468

ALKYL THIO SUBSTITUTED AMINO BENZOIC ACID ALKAMINE ESTERS AND SALTS THEREOF

John J. Donleavy, Hamden, Conn., assignor, by mesne assignments, to Allied Laboratories, Inc., Kansas City, Mo., a corporation of Delaware No Drawing. Application July 1, 1939, Serial No. 282,352

5 Claims. (Cl. 260—470)

This invention relates to the newly discovered group of organic compounds which have a local anaesthetic action similar to cocaine or procaine, and the like. This application is a continuation in part of the copending application, Serial No. 107,747, filed October 26, 1936, and entitled, "Alkyl thio-substituted benzoic acid alkamine ester salts, intermediates and process of preparing same," allowed January 4, 1939, now Patent No. 2,173,827, dated September 26, 1939.

The chief object of this invention is to prepare a compound which has local anaesthetic properties and which has a toxicity lower than or comparable to that of cocaine, or the like, and which has anaesthetic properties comparable to that of cocaine or procaine, or the like.

The compounds hereinafter mentioned have anaesthetic properties comparable to the two beforementioned well known local anaesthetics and are less toxic than the beforementioned two well known anaesthetics. This invention specifically relates to the products.

The products may have the general formula expressed algebraically as follows:

R'SC$_6$H$_3$(NH$_2$)COO(CH$_2$)$_x$NR''R''', wherein R' is an alkyl radical, R'' is an alkyl radical and R''' is an alkyl radical and $x$ is an integer greater than unity. In certain instances, R'' and R''' may be combined in the form of a polymethylene chain; for example, the group NR''R''' may be the piperidyl radical.

Broadly speaking, the product is an ester of an aromatic acid and an amino alcohol, or is a salt thereof.

Inasmuch as the aforementioned application, now Patent No. 2,173,827, fully and completely sets forth in considerable detail the highly desirable characteristics of the general class of products to which that disclosure and the instant disclosure is directed, no further mention, description or explanation is believed necessary.

It is, however, to be understood that the following specific disclosure is intended to be one of a subgeneric class disclosure as will be quite evident and fully apparent to any qualified chemist having the necessary technical background and experience. For that reason, the inclusion of other than the hereinafter recited examples has intentionally been omitted from the subsequent instant disclosure since in the copending application, now Patent No. 2,173,827, several examples were set forth to illustrate the species distinctions. All of the examples in the aforesaid disclosure relate to one subgeneric form of the broad class of which the instant invention is an example of the subgeneric division as well as several species thereof. For that reason, therefore, specific examples other than the ones given herein of species examples of this subgeneric class, have intentionally been omitted hereinafter. One specific compound or example herein disclosed is as follows:

The formula of this subsequent specific disclosure is set forth as follows for one compound of one series of compounds:

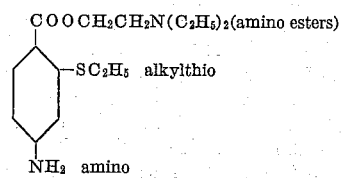

In the series of compounds which includes the above diagrammed compound, the

COOCH$_2$CH$_2$N(C$_2$H$_5$)$_2$ may vary in position and SC$_2$H$_5$ may vary in position relative to each other and the position of NH$_2$. Also in place of (C$_2$H$_5$) wherever the same appears other alkyl groups may be substituted therefor.

One example of the species group represented by the preceding diagram is:

DIETHYLAMINOETHANOL ESTER OF PARA-AMINO-ORTHO-ETHYLTHIOBENZOIC ACID

Para-nitro-ortho-aminobenzoic acid is prepared according to known methods. 9 grams of this acid are boiled with 25 cc. of concentrated hydrochloric acid diluted with 25 cc. of water. This converts the bright red acid to the yellow hydrochloride which does not dissolve completely but remains suspended in the solution. The mixture is then cooled in ice or the like to 0° C., and a solution of 3.6 grams of sodium nitrite in 10 cc. of water is added slowly. Throughout the addition, the temperature is maintained below 1° C. Vigorous stirring is maintained for 5 minutes after the addition is complete to insure complete diazotization.

The cold diazonium salt solution thus obtained is poured into a well stirred solution of 7.5 grams of potassium ethyl xanthate and 19 grams of sodium carbonate in 100 cc. of water heated to 70°. Stirring is continued until the evolution of gases ceases.

A solution of 6 grams of sodium hydroxide in 25 cc. of water, and 7.5 grams of diethyl sulphate are added to the cold reaction mixture. The solution is refluxed for 5 hours to complete alkylation.

When concentrated hydrochloric acid is added to this cold mixture, para-nitro-ortho-ethylthiobenzoic acid separates out. This product is dissolved in 10% sodium hydroxide solution for neutralization and reprecipitated to remove some of the impurities present. The product, para-nitro-ortho-ethylthiobenzoic acid, is finally purified by crystallization from dilute acetic acid. By titration, the molecular weight was found to be 227, while the calculated molecular weight is 223. The calculated percentage of nitrogen therein is 6.16%, whereas that found by analysis was 5.94%.

6½ grams of the above para-nitro-ortho-ethylthiobenzoic acid is then mixed with 5.6 grams of phosphorus pentachloride in a flask fitted to a reflux condenser. 5 cc. of phosphorus oxychloride is added and after the initial violence of the reaction subsides, the mixture is refluxed for ½ hr. After removal of the phosphorus oxychloride under reduced pressure, the residue is taken up in boiling chloroform. The chloroform then is distilled off. The product, para-nitro-ortho-ethylthiobenzoyl chloride, is then recrystallized from high boiling (80°–100°) petroleum ether.

Para-nitro-ortho-ethylthiobenzoyl chloride was found to melt at 107° C. The calculated percentage of nitrogen in this product was 5.74% and that found by analysis was 5.47%.

To a solution of 3.5 grams of diethylaminoethanol in 50 cc. of dry xylene is added exactly 0.69 gram of sodium. The mixture is heated under reflux until all the sodium has dissolved. To this resulting sodium alcoholate solution is added 7.35 grams of the last mentioned acid chloride dissolved in a small amount of dry xylene. This mixture is refluxed for 2 hrs. When the filterd solution is treated with a slow current of dry hydrogen chloride, there separates therefrom, as a gummy mass, the hydrochloride of diethylaminoethyl para-nitro-ortho-ethylthiobenzoate. The crude salt was purified by crystallization from dry acetone. It was found to have a melting point of 150° C. The calculated nitrogen percentage in such compound was 7.43%, and analysis showed 7.45% present.

4 grams of the last mentioned hydrochloride is dissolved in 60 cc. of absolute ethyl alcohol. 0.08 gram of platinum oxide catalyst (according to Adams) is added. The solution is shaken under pressure of hydrogen for 8 hrs. The solution is filtered after standing until the platinum coagulates, and the alcohol is removed under diminished pressure. The residue is then boiled with dry acetone to remove any unchanged material. The product is then recrystallized from absolute alcohol. The hydrochloride of diethylarminoethyl para-amino-ortho-ethylthiobenzoate thus obtained was found to melt at 163° C. The percentage of nitrogen found in this product was 8.34%. The calculated percentage of nitrogen was 8.41%.

The free base, diethylaminoethyl para-amino-ortho-ethylthiobenzoate, may be obtained as an oily liquid by adding alkali to an aqueous solution of the hydrochloride.

These products, diethylaminoethyl para-amino-ortho-ethylthiobenzoate and its hydrochloride, mentioned hereinbefore, upon test have been determined to have suitable anaesthetic power comparable to procaine and cocaine, and to have less toxicity than these two last mentioned products.

A second broad example is the dialkylaminoalkyl esters of various 3-amino-4-alkylthiobenzoic acids. As representatives of this type, there have been prepared the beta-diethylaminoethyl esters of 3-amino-4-methylthiobenzoic, 3-amino-4-ethylthiobenzoic and 3-amino-4-n-propylthiobenzoic acids and the gamma-diethylaminopropyl esters of the two first mentioned acids.

A convenient method of preparing compounds of this type depends on the discovery that the chlorine atom of derivatives of 3-nitro-4-chlorobenzoic acid such as its salts, esters and amides, can readily be replaced by an alkylthio group by treatment with a metal mercaptide, the products being the corresponding derivatives of 3-nitro-4-alkylthiobenzoic acids. Subsequently the nitro group may be converted to an amino group by treatment with a reducing agent and the acid derivative group converted to the desired ester group by known procedures, with the provision that in these later processes conditions known to be damaging to the alkylthio group, such as excessive alkalinity, should be avoided. Reduction of the nitro group to an amino group has been successfully accomplished with a variety of agents known to be capable of producing this transformation in other instances and a preferred method has been indicated in the examples hereinafter set forth. Experimentation with a number of known procedures for producing the desired ester grouping has disclosed certain successful examples and one of those found to be the most convenient is set forth.

*Method*

A solution of the sodium salt of 3-nitro-4-chlorobenzoic acid was prepared by adding 10 grams of sodium bicarbonate and 24.5 grams of 3-nitro-4-chlorobenzoic acid to a mixture of 180 cc. of 95% alcohol and 180 cc. of water. This solution was heated to boiling and mixed with a boiling solution of sodium methyl mercaptide, prepared by bubbling 12 grams of methyl mercaptan slowly into a solution of 4.8 grams of sodium hydroxide in a mixture of 36 cc. of water and 360 cc. of 95% alcohol.

The mixture of these two solutions was boiled for one hour under reflux. The solvent was then removed by distillation under reduced pressure, and the residue, consisting of sodium chloride and the sodium salt of 3-nitro-4-methylthiobenzoic acid, was dissolved in the smallest possible amount of warm water. The resulting solution was acidified with concentrated hydrochloric acid, and the 3-nitro-4-methylthiobenzoic acid which precipitated was filtered from the solution after thorough cooling. After purification by recrystallization from 95% alcohol, this acid was obtained as a light yellow solid which melted at 240° C.

Ten grams of 3-nitro-4-methylthiobenzoic acid was added to 75 cc. of thionyl chloride and the mixture was boiled under reflux, whereupon the acid gradually dissolved. Boiling was continued for thirty minutes after the solution had become clear and the excess thionyl chloride was then removed by distillation under diminished pressure. The solid remaining was recrystallized from high-boiling petroleum ether, and pure 3-nitro-4-methylthiobenzoyl chloride was obtained. This substance consists of long, yellow needles which melt at 111° C.

A mixture of 3-nitro-4-methylthiobenzoyl chloride and enough methyl alcohol to maintain a clear solution was boiled under reflux until evolution of hydrogen chloride ceased. The solution was then cooled, whereupon crystals of the methyl ester of 3-nitro-4-methylthiobenzoic acid separated. This ester is a bright yellow solid which melts at 117° C.

Twenty-five grams of the pure methyl ester of 3-nitro-4-methylthiobenzoic acid and 2.5 grams of platinum oxide catalyst (Adams) were suspended in 250 cc. of alcohol and shaken with hydrogen under a pressure of 25 pounds until no further action occurred. The platinum catalyst was filtered from the solution and the alcohol was removed by distillation on the steam bath. The oily residue was then distilled under reduced pressure, and the methyl ester of 3-amino-4-methylthiobenzoic acid was obtained as a clear yellow oil, which distilled at 170° C. at a pressure of 4 mm. and gradually solidified at room temperature. After purification by recrystallizing from alcohol, the ester consists of white, feathery needles which melt at 61° C.

A mixture of eight grams of the methyl ester of 3-amino-4-methylthiobenzoic acid and 30 cc. of beta-diethylaminoethanol was added to 5 cc. of beta-diethylaminoethanol saturated with dry hydrogen chloride. The mixture was heated under reflux at a temperature of 170°–175° C. for 125 hours, after which the excess beta-diethylaminoethanol was removed by distillation under diminished pressure and the residual oil, containing the final product, beta-diethylaminoethyl ester of 3-amino-4-methylthiobenzoic acid, in an impure state was neutralized with cold sodium bicarbonate solution. The resulting mixture was extracted several times with ether, and the ether extracts were dried and distilled under diminished pressure. The relatively pure beta-diethylaminoethyl ester of 3-amino-4-methylthiobenzoic acid was obtained as a viscous, yellow oil which distilled at 218° C. under 5 mm. pressure.

The monohydrochloride of this ester was prepared by dissolving the ester in dry ether and adding about 1.25 molecular proportions of dry hydrogen chloride dissolved in dry ether. The monohydrochloride of this ester separated as a flocculent precipitate. After recrystallization from absolute ethyl alcohol, this monohydrochloride of this ester consists of a white crystalline powder which melts at 168–72° C.

The ethylthio and n-propylthio homologs have been prepared in a similar manner using ethyl mercaptan and n-propyl mercaptan, respectively, in place of methyl mercaptan and as outlined initially herein for the production of the named ester and its hydrochloride. The products obtained in the different steps of these two procedures have the following physical constants: 3-nitro-4-ethylthiobenzoic acid, M. P. 231° C.; 3-nitro-4-n-propylthiobenzoic acid, M. P. 234° C.; the corresponding chlorides, M. P. 102° C., and 94° C., respectively; the methyl esters, M. P. 130° C. and 97° C., respectively; the methyl ester of 3-amino-4-ethylthiobenzoic acid, B. P. 180° C. at 4 mm.; the methyl ester of 3-amino-4-n-propylthiobenzoic acid, B. P. 182° C. at 6 mm.; the corresponding beta-diethylaminoethyl esters, B. P. 218–23° C. at 4 mm., and 230–4° C. at 4 mm. respectively; and the corresponding hydrochlorides, M. P. 118–23° C. and 190–4° C., respectively.

In similar manner, using gamma-diethylaminopropanol in place of beta-diethylaminoethanol, the corresponding products obtained were the gamma-diethylaminopropyl esters of 3-amino-4-methylthiobenzoic acid, B. P. 215–8° C. at 4 mm. pressure, and 3-amino-4-ethylthiobenzoic acid, B. P. 230–5° C. at 4 mm. pressure. The corresponding monohydrochlorides of these esters melt at 175–9° C. and 166–71° C. respectively.

Aminoalcohols of the type of beta-piperidinoethanol, in which the two alkyl groups are combined in a ring, are intended to be included in the dialkylaminoalcohols covered by this disclosure, as is the case in the copending application referred to, now Patent No. 2,173,827, dated September 26, 1939.

While the invention has been described in great detail in the foregoing specifications, the same is to be considered as illustrative only and not restrictive in character.

Modifications comparable to those disclosed in the copending application, as well as others will readily suggest themselves to persons skilled in this art. At the present time an isomeric series to the new compounds herein described are being subjected to experimental and clinical tests. The present disclosure is intended as a basic disclosure of basic compounds previously described and the related compounds which differ in the position of the groups in the benzene ring.

The invention claimed is:

1. An organic compound of the group consisting of esters having the formula

R'S(NH₂) C₆H₃COO(CH₂)ₓNR''R''' where $x$ is an integer greater than unity and R', R'' and R''' represent alkyl radicals, and acid addition compounds thereof.

2. An organic compound having the formula para-R'S-meta-NH₂ C₆H₃COO (CH₂)ₓ NR''R''', where $x$ is an integer greater than one and less than four and R', R'' and R''' represent alkyl radicals containing not more than six carbon atoms.

3. An organic compound having the formula ortho-R'S-para-NH₂ C₆H₃COO (CH₂)ₓ NR''R''', where $x$ is an integer greater than one and less than four and R', R'' and R''' represent alkyl radicals containing not more than six carbon atoms.

4. Diethylaminoethyl para-methylthio-meta-amino-benzoate.

5. Diethylaminopropyl para-methylthio-meta-amino-benzoate.

JOHN J. DONLEAVY.